United States Patent [19]

Cheng et al.

[11] Patent Number: 5,676,532
[45] Date of Patent: Oct. 14, 1997

[54] ADJUSTABLE ONE-WAY ROTARY LIQUID PUMPING DEVICE

[76] Inventors: Lu Chi Cheng; Chun-Hsiung Chang, both of P.O. Box 82-144, Taipei, Taiwan

[21] Appl. No.: 629,133

[22] Filed: Apr. 8, 1996

[51] Int. Cl.⁶ .............................. F04B 23/00; F04C 2/344; F04C 15/04; F16D 57/06
[52] U.S. Cl. .................. 417/440; 418/15; 418/135; 418/225; 418/267; 188/290
[58] Field of Search .......................... 417/440; 418/15, 418/135, 225, 267; 188/290

[56] References Cited

U.S. PATENT DOCUMENTS

| | | | |
|---|---|---|---|
| 1,265,070 | 5/1918 | Feyzes | 417/440 |
| 1,617,366 | 2/1927 | Beard et al. | 188/290 |
| 2,784,554 | 3/1957 | Badalini | 418/225 |
| 3,748,063 | 7/1973 | Putnam | 418/135 |
| 4,025,246 | 5/1977 | Normandin | 188/290 |

FOREIGN PATENT DOCUMENTS

| | | | |
|---|---|---|---|
| 621618 | 2/1927 | France | 418/225 |
| 2010080 | 10/1971 | Germany | 188/290 |
| 5726291 | 2/1982 | Japan | 418/15 |
| 506697 | 3/1976 | Russian Federation | 418/225 |
| 133890 | 9/1929 | Switzerland | 418/15 |

*Primary Examiner*—John J. Vrablik
*Attorney, Agent, or Firm*—Alfred Lei

[57] ABSTRACT

An adjustable one-way rotary liquid pumping device including a housing, a cover fixedly engaged with the housing, a first bearing a first bearing fitted in the housing, a second bearing fitted in the cover, an axle extending through the housing and the cover and supported by the two bearings, a rotor fixedly mounted on the axle and having a plurality of pawls, a collar enclosing the rotor, a seat having two protuberances supporting the collar thereby locating the collar at an eccentric position with respect to the axle, a plurality of rollers each fitted between every two of the pawls of the rotor, a plurality of springs urging respective rollers against an inner wall of the housing and an inclined side of the pawls, and an adjustable valve fitted through the housing, the collar, and the seat, whereby the liquid can be pumped in one direction only and the speed of the axle can be adjusted as required.

3 Claims, 7 Drawing Sheets

5,676,532

ADJUSTABLE ONE-WAY ROTARY LIQUID PUMPING DEVICE

BACKGROUND OF THE INVENTION

1. Field of the Invention

This invention relates to an adjustable one-way rotary liquid pumping device.

2. Description of the Prior Art

It has been found that the conventional one-way bearing is simply a ratchet wheel which cannot be adjusted in speed. Furthermore, the prior art damping device (see FIG. 1) only utilizes a lining cloth to reduce the frictional force between the lining cloth and the rotating disk. Hence, when required to obtain these two functions, it will be necessary to prepare a one-way ratchet mechanism and a damping device thereby increasing the cost. In addition, the conventional damping device is noisy in operation and difficult to adjust in speed.

Therefore, it is an object of the present invention to provide an adjustable one-way rotary liquid pumping device which can obviate and mitigate the above-mentioned drawbacks.

SUMMARY OF THE INVENTION

This invention relates to an adjustable one-way rotary liquid pumping device.

It is the primary object of the present invention to provide an adjustable one-way rotary liquid pumping device which can effectively pump liquid at a low speed.

It is another object of the present invention to provide an adjustable one-way rotary liquid pumping device which will pump liquid only in one direction.

It is still another object of the present invention to provide an adjustable one-way rotary liquid pumping device which is simple in construction.

It is still another object of the present invention to provide an adjustable one-way rotary liquid pumping device which is easy to manufacture.

It is a further object of the present invention to provide an adjustable one-way rotary liquid pumping device which is facile to assemble.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
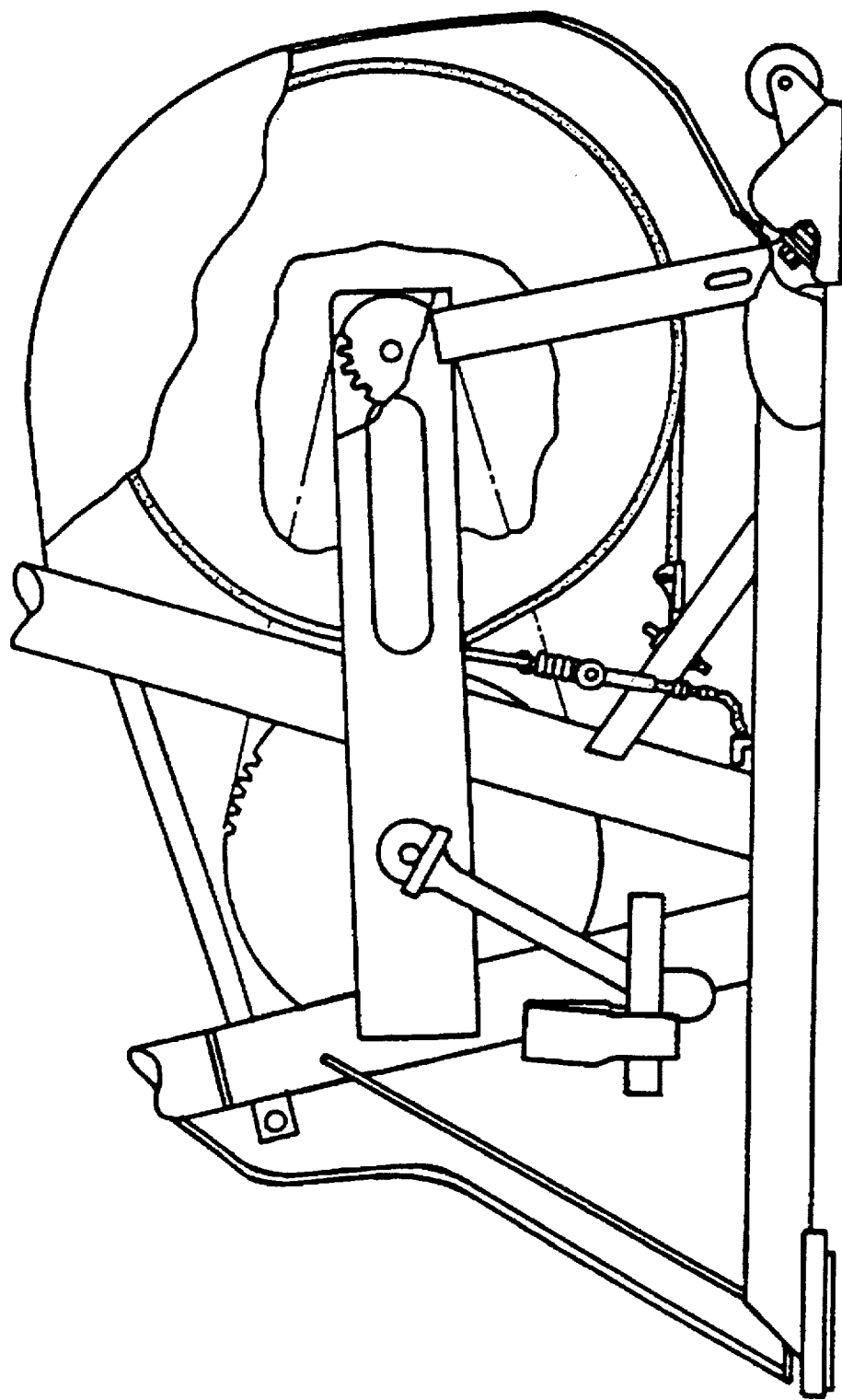
FIG. 1 illustrates a prior art adjustable damping device.
Figure 2:
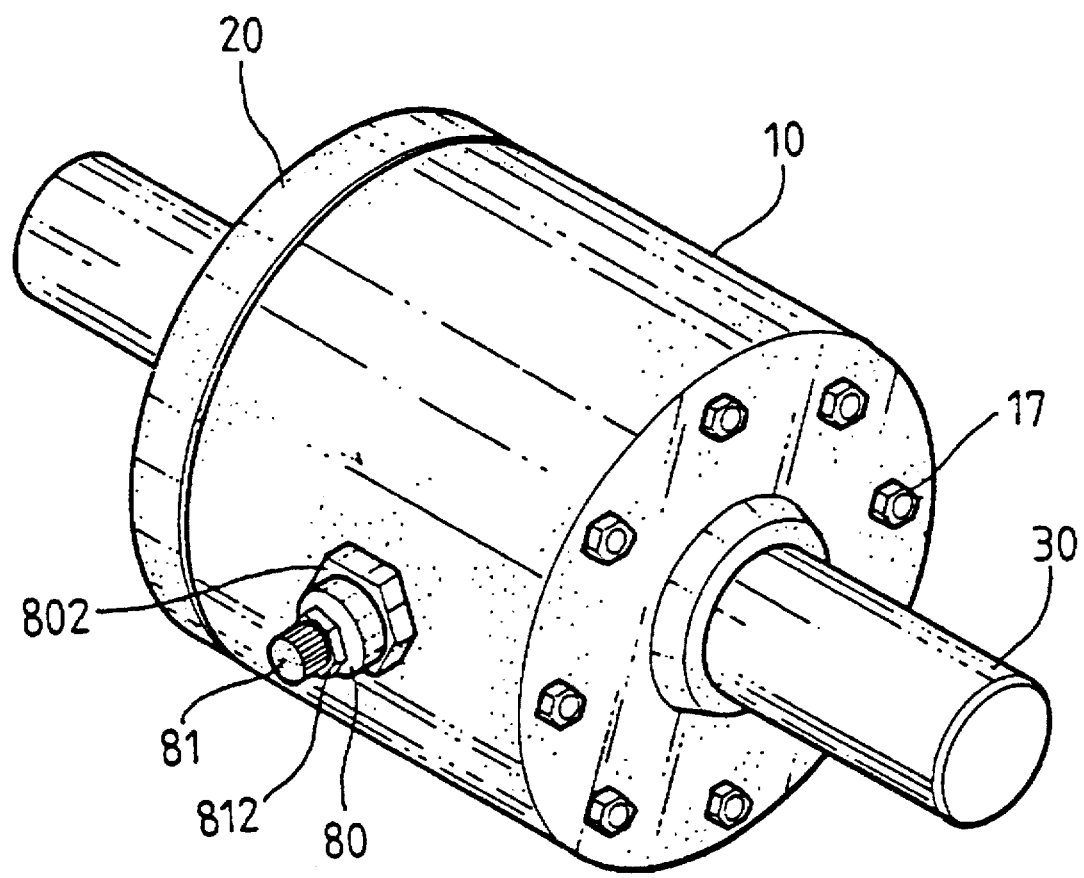
FIG. 2 is a perspective view of the present invention.
Figure 3:
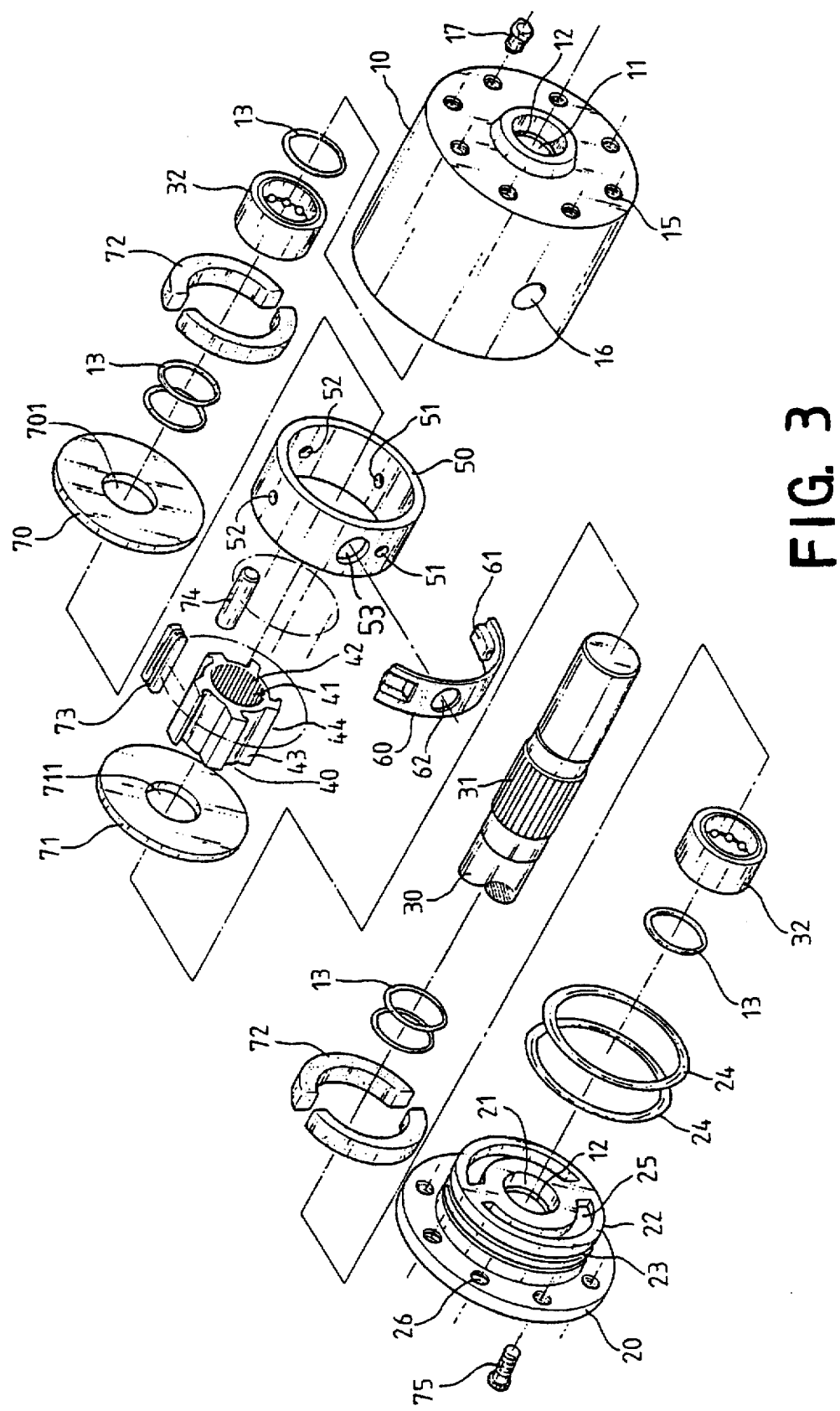
FIG. 3 is an exploded view of the present invention.
Figures 4, 4A:
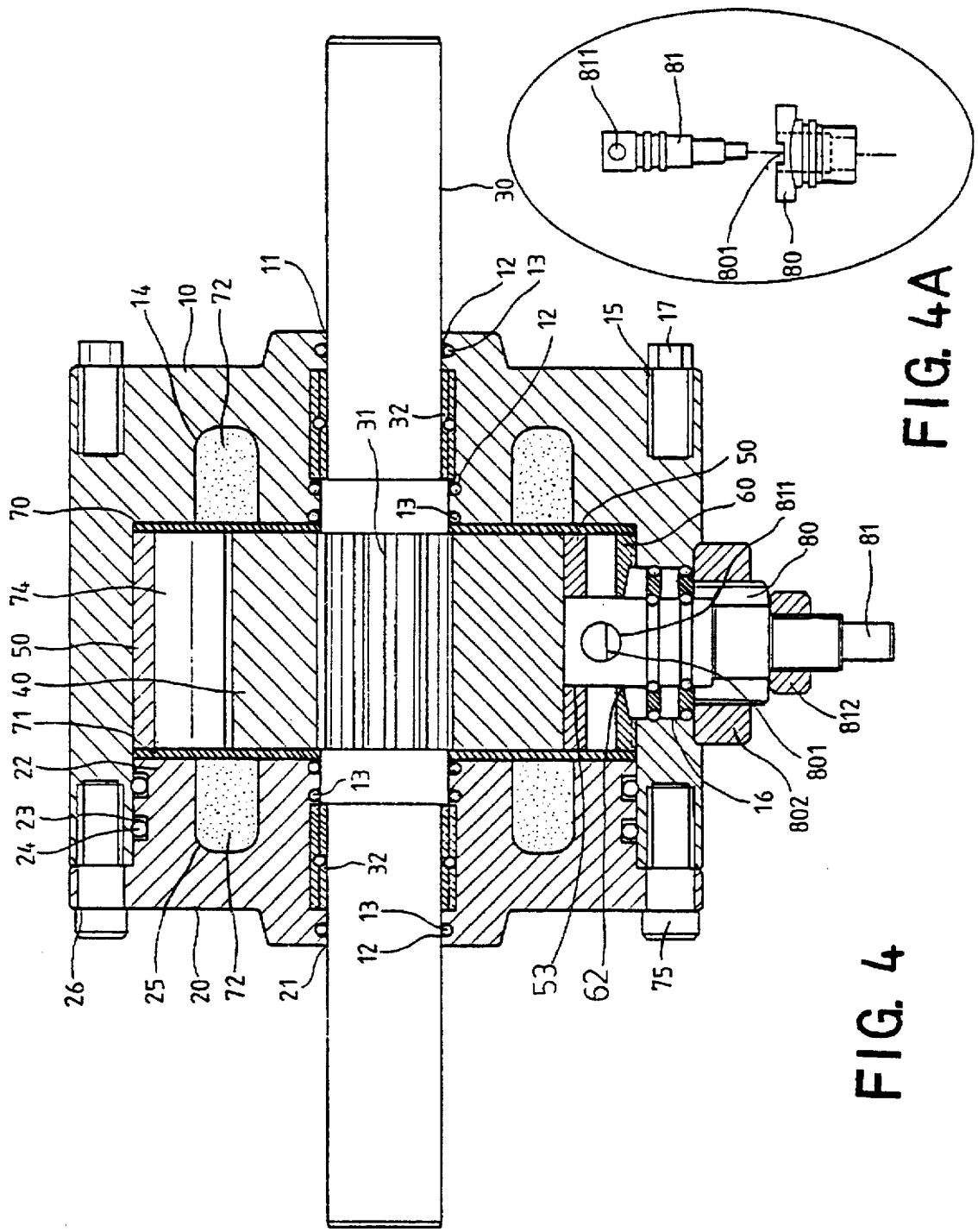
FIG. 4 is a longitudinal sectional view of the present invention.
FIG. 4A is an exploded view of the valve.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 2, 3, 4, 4A and 5, the present invention mainly comprises a housing 10, a cover 20, an axle 30, a rotor 40, a collar 50, a seat 60, two press plates 70 and 71, a plurality of semi-circular resilient members 72, a plurality of springs 73, a plurality of rollers 74, and a valve seat 80.

The housing 10 is a cylindrical member having an axial hole 11 formed with three circular grooves 12 each adapted to receive a O-ring 13. A bearing 32 is arranged within the axial hole 11. Further, the housing 10 is formed with two semi-circular recesses 14 for receiving the curved resilient members 72. The front end of the housing 10 is formed with a plurality of threaded holes 15 which are separated by equal distance and adapted to engage with bolts 17. At one side of the housing 10 there is a radial hole 16 for receiving a valve seat 80.

The cover 20 is generally circular in shape which has an axial hole 21 formed with three circular grooves 12 in each of which is fitted a O-ring 13. A bearing 32 is arranged within the axial hole 21 of the cover 20. The neck portion 22 of the cover 20 has a circular groove 23 adapted to receive a O-ring 24. The inner side of the neck portion 22 has two semi-circular recesses 25 for receiving two curved resilient members 72. The flange of the cover 20 has a plurality of threaded holes 26 which are separated by equal distances so that the cover 20 can be fixedly mounted on a rear end of the housing 10 by bolts 75.

The axle 30 is formed with a plurality of external teeth at its intermediate portion and supported by a bearing 32 at both ends thereof.

The rotor 40 has an axial hole 41 formed with a plurality of internal teeth 42 adapted to engage with the external teeth of the axle 30. Further, the rotor 40 has a plurality of pawls 44 each having an inclined side 43.

The collar 50 has a radial hole 53, two drain ports 51 and two inlets 52 and is smooth at its inner surface. The seat 60 is a curved member having two protuberances 61 at two ends and an opening 62 between the two protuberances 61.

The circular plates 70 and 71 are formed with center holes 701 and 711, respectively.

The valve seat 80 is formed with a passage 801 at the upper end and has its upper portion fitted in the opening 62 of the seat 60 and the hole 53 of the collar 50. The valve seat 80 is fixedly installed on the housing 10 by a nut 802. A valve element 81 is fitted in the valve seat 80 and fixed thereon by a nut 812. The upper end of the valve element 81 is formed with a passage 811 which can be adjusted by regulating the engagement between the valve element 81 and the valve seat 80.

In assembly, the axle 30 is inserted into the axial hole 41 of the rotor 40, with the external teeth 31 of the axle 30 engaged with the internal teeth 42 of the rotor 40. A spring 73 and a roller 74 are fitted between every two pawls 44 of the rotor 40 so that the spring 73 urges the roller 74 against the inclined side 43 of the pawl 44 of the rotor 40 and the inner wall of the housing 10. The rotor 40 is sandwiched between the circular plates 71 and 70. Each of the curved resilient members 72 is fitted in one of the recesses 14 and 25. The resilient members 72 bias the plates 70 and 71 against the rotor 40 and collar 50. The collar 50 is arranged on the seat 60 and then the collar 50 together with the seat is disposed within the housing 10. The valve seat 80 is fitted in the hole 16 of the housing 10 and extends inwardly through the hole 62 of the seat 60 and the hole 53 of the seat 60. The O-rings 13 and 24 are fitted in the grooves 12 and 23, respectively. The two bearings 32 are mounted on two ends of the the axle 30. The cover 10 is fixedly mounted on the rear end of the housing 10 by the bolts 75. Then, the interior of the housing 10 is filled with oil.

Figure 5:
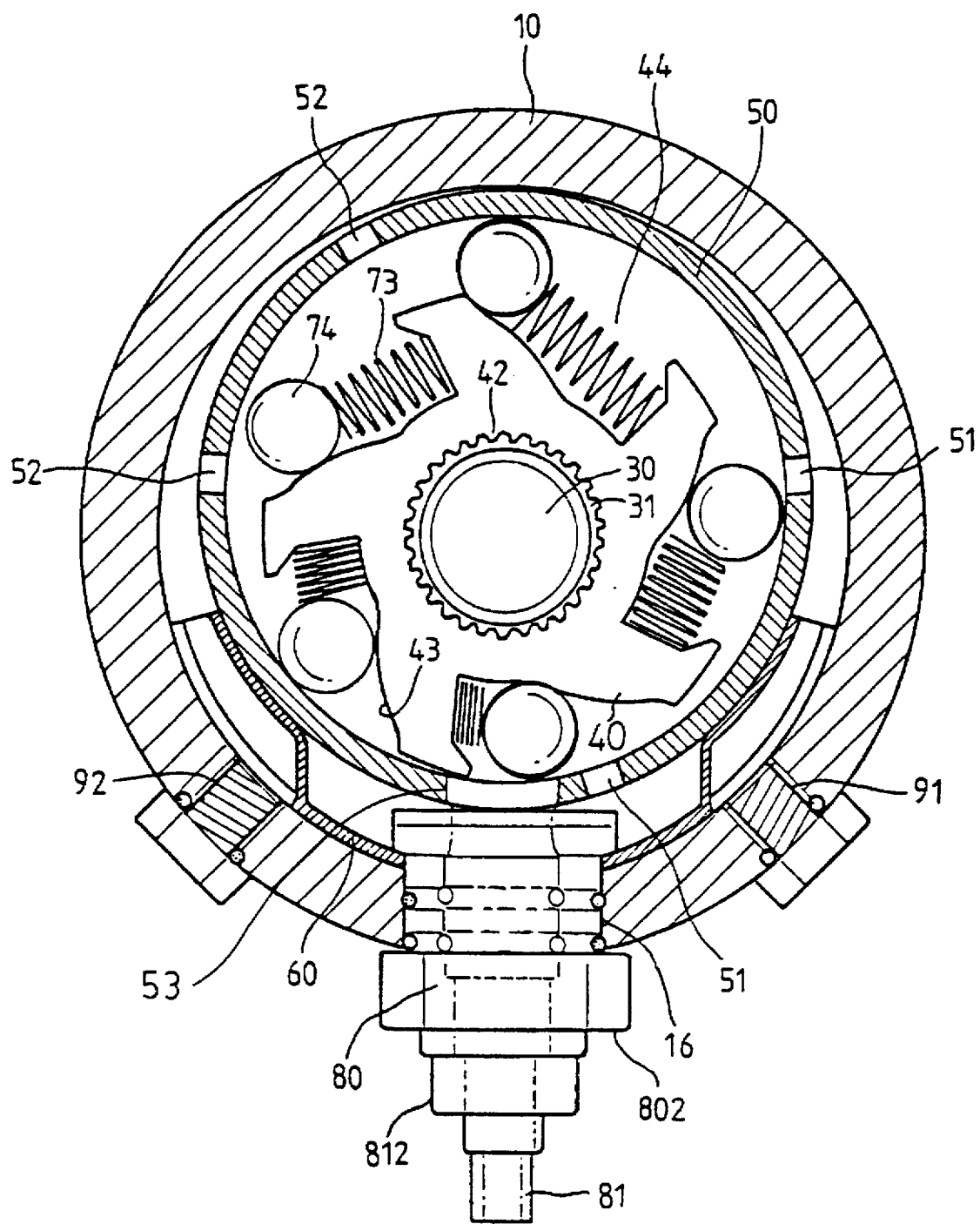
FIG. 5 is a cross sectional view of the present invention.
Figure 6:
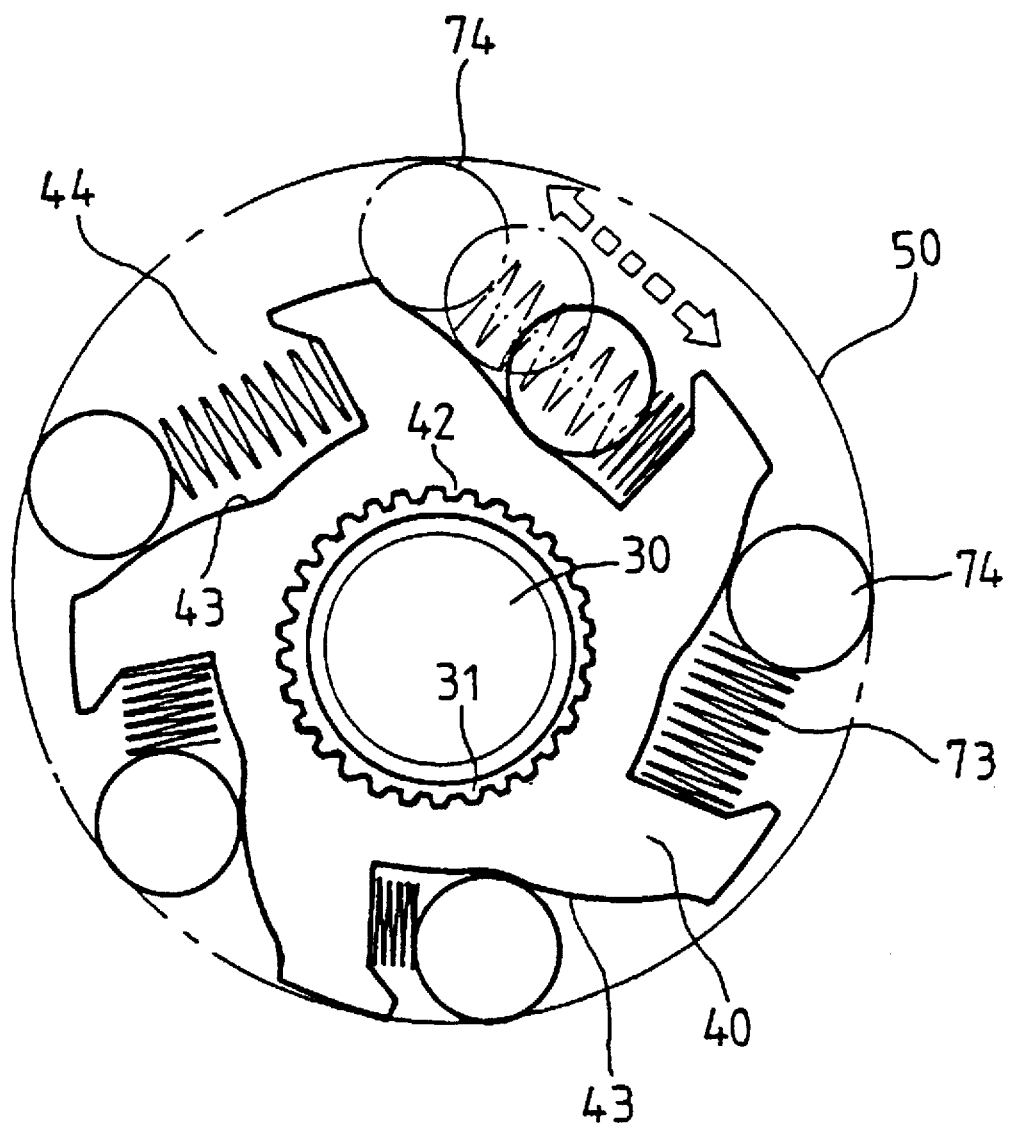
FIG. 6 is an enlarged view of the rotor.
Figure 7:
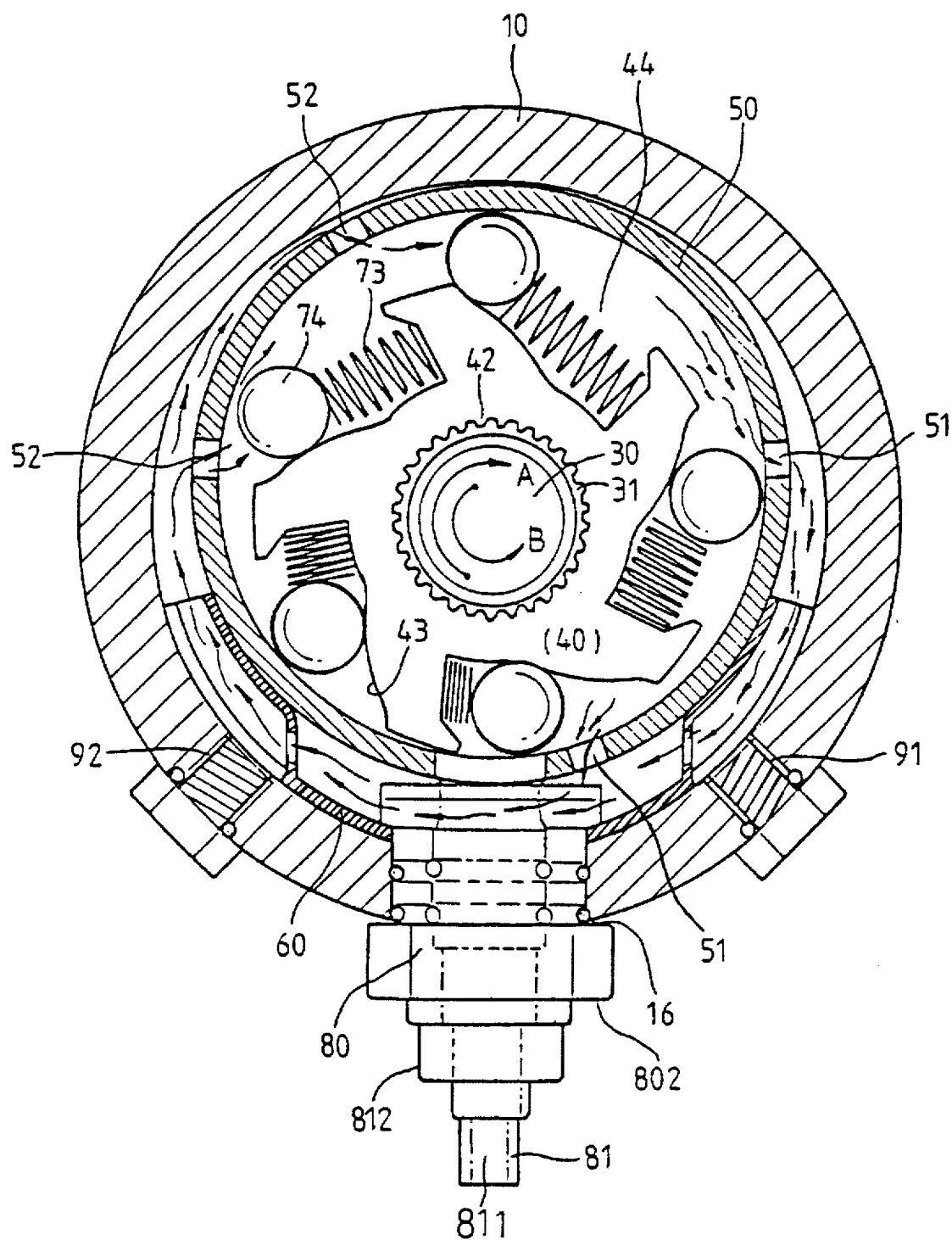
FIG. 7 is a working view of the present invention.

As illustrated in FIGS. 5, 6 and 7, the rollers 74 are urged against the inclined side 43 of the pawl 44 and the inner wall of the collar 50 by the spring 73. Furthermore, the collar 50 is pushed upwardly by the seat 60 so that the collar 50 will be located at an eccentric position with respect to the axle 30. When the rotor 40 rotates in clockwise direction A, the rollers 74 will pump the oil to flow out out the drain port 51 of the collar 50 into the space between the collar 50 and the housing 10. Then, the oil flows through the passage 811 of the valve element 81 where the flow rate of the oil can be controlled. Thereafter, the oil flows back into the collar 50 through the inlets 52 thereby circulating the oil within the housing 10. Hence, the flow rate of the oil can be controlled by adjusting the valve element 81 thereby controlling the speed the axle 30.

In addition, the present invention can be used as a pump by connecting the drain port 91 and inlet 92 (see FIG. 7) to an oil trough and an oil sucking pipe respectively and appropriately adjusting or turning off the valve element 81.

Conclusively, the present invention can be used for pumping liquid even at a speed below 50 rpm, whereas the prior art pump can only work properly at a speed above 500 rpm.

Furthermore, as the axle 30 drives the rotor 40 to rotate in counterclockwise direction B, the rollers 74 will not pump the oil thereby making the axle 30 stationary. That is, the axle 30 can be rotated in one way only.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

We claim:

1. An adjustable one-way rotary liquid pumping device comprising:

a housing having an open end, a first axial hole at another end and a radial hole, said axial hole having a coaxial circular groove in which is fitted an O-ring, said housing being formed at an inner side thereof with two first horizontal semi-circular recesses in each of which is fitted a semi-circular resilient member;

a cover fixedly engaged with said open end and having a second axial hole, said cover being formed at an inner side thereof with two second horizontal circular recesses which are aligned with said first horizontal circular recesses and in each of which is fitted a semi-circular resilient member;

a first bearing fitted in said first axial hole;

a second bearing fitted in said second axial hole;

an axle extending through said housing and said cover and supported by said first bearing and said second bearing;

a rotor fixedly mounted on said axle and having a plurality of pawls each having an inclined side;

a collar enclosing said rotor and having a first hole, two drain ports and two inlets, said first hole being aligned with said radial holes;

a seat having two protuberances supporting said collar thereby locating said collar at an eccentric position with respect to said axle and and having a second hole aligned with said first hole;

a plurality of rollers each fitted between every two of said pawls of said rotor;

a plurality of springs urging respective rollers against an inner wall of said housing and said inclined side of said pawls; and an adjustable valve fitted through said radial hole of said housing, said first hole of said collar, and said second hole of said seat.

2. The adjustable one-way rotary liquid pumping device as claimed in claim 1, wherein said rotor has at least two pawls.

3. The adjustable one-way rotary liquid pumping device as claimed in claim 1, wherein said cover is fixedly mounted on said housing by bolts.

\* \* \* \* \*